2,906,311

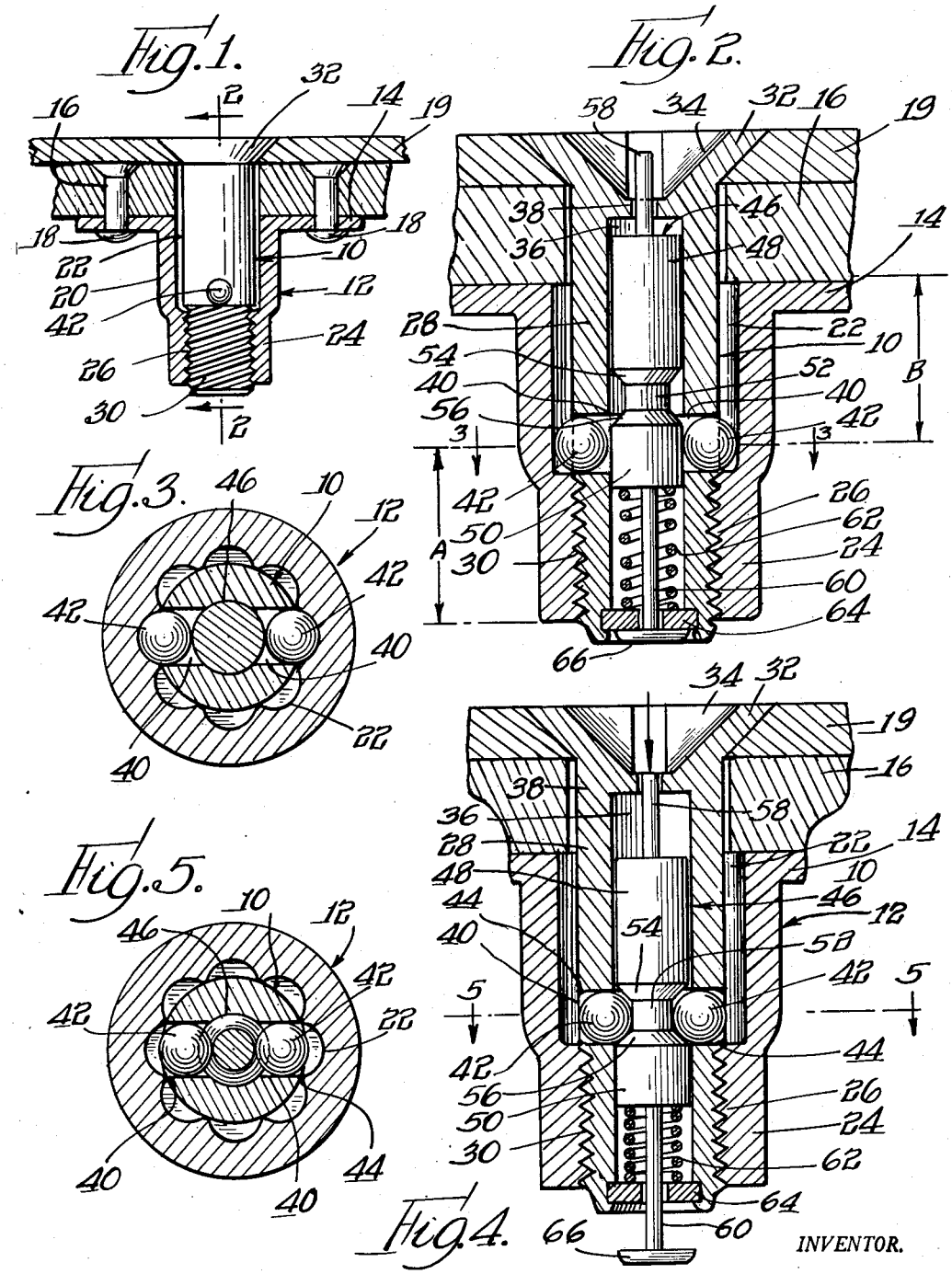

STUD CARRIED LOCKING DETENTS WITH MEANS TO HOLD THE DETENTS IN LOCK POSITION

Thomas R. Boyd, Park Ridge, Ill., assignor to Illinois Tool Works, Chicago, Ill., a corporation of Illinois Application November 1, 1956, Serial No. 619,764

4 Claims. (Cl. 151—9)

This invention is concerned with the fastener art, and more particularly with a rotary threaded fastener.

It is an object of this invention to provide a self-locking, rotary threaded fastener.

More particularly, it is an object of this invention to provide a rotary threaded fastener having self-locking means released by cooperative engagement of a driving member with the fastener.

More particularly, it is an object of this invention to provide a screw fastener and locking structure associated therewith wherein locking means on the screw fastener cooperatively engage with the locking structure, and are automatically disengageable upon cooperative engagement of a driving tool with said screw fastener.

Other objects and advantages of the present invention will be apparent from the following description when taken in connection with the accompanying drawing wherein:

Fig. 1 is a longitudinal sectional view illustrating the principles of the invention, the rotary fastener being shown in side view;

Fig. 2 is a longitudinal sectional view taken substantially along the line 2—2 in Fig. 1;

Fig. 3 is a cross sectional view taken along the line 3—3 in Fig. 2;

Fig. 4 is a longitudinal sectional view similar to Fig. 2 but showing the parts in a different position of operation; and Fig. 5 is a cross sectional view taken along the line 5—5 of Fig. 4.

Referring now in greater particularity to the drawing there will be seen a rotary threaded fastener or bolt 10 constructed in accordance with the principles of this invention, and preferably cooperating with a threaded receptacle 12. The receptacle is provided with a laterally extending circumferential flange 14 by means of which it is held to a work sheet or surface 16, such as by rivets 18. A work part or panel 19 is held against the surface 16 by the bolt 10 as will be apparent shortly. The receptacle 12 further includes a generally cylindrical or tubular body 20 having longitudinally extending, internal flutes 22 arcuately spaced therein, and having a reduced tip 24, which is internally threaded at 26 to receive the fastener or bolt 10.

The rotary threaded fastener or bolt 10 comprises a shank 28 threaded at its extremity at 30 for cooperation with the receptacle threads 26, and a head 32 having a driving slot 34 therein. In the present instance the head 32 is beveled for flush mounting in the attached panel or work part 19, and the driving slot 34 is of the well-known cruciform type.

The shank 28 of the threaded fastener or bolt 10 is provided with an axial bore 36 leading from the lower end of the shank almost to the upper end, being provided with a restricted opening 38 communicating with the screw driver slot or socket 34. A pair of lateral openings 40 is provided in the shank located diametrically opposite to one another, and communicating with the axial bore 36. A pair of balls 42 is received in these openings, and the outer ends of the openings are of slightly reduced diameter to preclude the balls from passing outwardly therethrough, as is indicated at 44.

A plunger 46 is reciprocably mounted in the bore 36, and includes an upper cylinder 48 spaced above a lower cylinder 50 by an intermediate neck or restricted portion 52 joined to the two cylinders by opposed beveled or cam surfaces 54 and 56. A pin 58 extends upwardly from the plunger 46 and extends through the restricted opening 38 into the driving slot or socket 34.

A rod or shaft 60 extends downwardly from the plunger 46, and is surrounded by a compression helical spring 62 trapped between the bottom cylinder 50 and a retaining washer 64 secured within the lower end of the bolt shank 28. The spring 62 urges the plunger 48 upwardly, and such upward movement is limited by a flat head 66 on the end of the shaft or rod 60. The head butts the retaining washer 64, and is preferably recessed in the end of the shank 28.

The spring 62 normally holds the plunger 46 in its uppermost position as limited by the head 66 abutting the washer 64. In this position, the lower cylinder 50 is positioned between the balls 42, and the balls are held fixedly in place projecting laterally outwardly beyond the shank 28. When a screw driver is seated in the slot or socket 34, the screw driver automatically depresses the pin 58. This moves the plunger 46 from the normal position of Figs. 2 and 3 to the lowered position of Figs. 4 and 5. In this position, the restricted neck 52 of the plunger 46 is positioned directly between the balls 42, and the balls are free to move radially inwardly into the shank 28, and part way into the axial bore 36 therein, whereby the balls are flush with the outer surface of the shank.

With the balls flush with the outer surface of the shank as in Figs. 4 and 5, the bolt 10 readily can be threaded into the receptacle 12. When the bolt has been turned down tight, the screw driver is removed, and this allows the plunger 46 and pin 58 to rise under the influence of the spring 62, until limited by abutment of the head 66 against the washer 64. Upward movement of the plunger 46 causes the lower bevel or cam surface 56 to cam the balls outwardly into the flutes 22 of the receptacle, and the lower cylinder 50 thereafter positively holds the balls in this outward position. With the balls 42 projecting into the flutes 22, and firmly locked by the lower cylinder 50 against radially inward movement, it will be apparent that the bolt or stud 10 is locked against rotation. Accordingly, the bolt cannot be removed until a screw driver is inserted in the driving slot or socket, and the bolt cannot accidentally work loose.

The distance from the bottom of the threaded portion of fastener or bolt 10 to the center line of the balls, as indicated at A in Fig. 2, is equal to or greater than the distance from the center line of the balls to a point along the wall of the aperture through the sheet 16, such distance being indicated at B. Thus, the screw driver will hold the pin 58 depressed, allowing retraction of the balls, until the bolt 10 has been backed out to a point where the balls will engage within the aperture in the sheet 16 and will not lock the bolt.

It will be understood that the bolt 10 can be moved axially with the balls within the aperture in the sheet 16 during separation of the sheets or parts 16 and 19. When these parts have been separated and the bolt has been sufficiently retracted to clear the sheet 16, the balls will move outwardly, automatically to retain the bolt in the work part 19.

In the specific example of the invention as herein shown and described, the bolt and receptacle preferably are provided with fast acting threads, with two, four, or six leads. However, it will be understood that a simple and relatively shallow thread could be provided. Furthermore, it is contemplated that the bolt could be used with a conventional nut, in which case the balls would be released to project radially outwardly beyond the rear face of the nut. In some instances the parts could be dimensioned to that the balls would project into frictional contact with the threads to resist loosening of the bolt, or could even deform the threads of the receptacle somewhat to lock the bolt in place. As an example of a typical installation embodying the fastener, the panel 16 may be considered as the fixed skin structure of an airplane and the panel 19 as a cowling part. The bolt is telescopically associated with panel 19 and held captive in a corresponding aperture by the locking balls 42. The panel 19 is then juxtaposed with respect to the panel 16 and if multiple bolts are employed, each bolt is positioned in alignment with a corresponding receptacle on the panel 16. The operator then individually depresses each plunger 48 by engaging the projection 58 with a suitable tool so that the balls may recede into the reduced diameter portion 52 when the balls engage the surface of the panel 16 around each aperture therein, thus permitting each bolt to be forced inwardly to a position for initial engagement between the threads 26, 30. The balls will then be within the receptacle and the two panels may be placed in flush surface contact and the bolts thereafter tightened.

It will be understood that the specific example of the invention as herein shown and described is for illustrative purposes only. Various changes in structure will no doubt occur to those skilled in the art, and are to be understood as forming a part of this invention insofar as they fall within the spirit and scope of the appended claims.

The invention is claimed as follows:

1. A fastener device for removably retaining together adjacent first and second apertured workpieces, and comprising a stud accommodating receptable including an internally threaded body portion remote from an attachment end portion with flange means extending laterally therefrom and spaced axially from the body portion for attachment to said first workpiece, said attachment portion having a counterbore of predetermined axial length extending from said flange means toward said body portion, the counterbored portion being provided with axially extending recess means, a rotary stud member including an enlarged head adapted to engage said second workpiece and a cylindrical hollow shank having an external thread along the inner end thereof cooperable with the internally threaded body portion of the receptacle for removably connecting the same, said shank intermediate the ends thereof being radially apertured, locking means disposed in said radial aperture for cooperation with the recess means to prevent rotation of the stud member when in applied position, a plunger centrally positioned within the hollow shank and including a stop portion engageable with said locking means to positively maintain the locking means in engagement with the recess means, resilient means axially disposed within the lower end of said shank and bearing against the inner end of said plunger and an inward shoulder formed adjacent the inner end of said shank for biasing said plunger to a limit position with the stop portion positively maintaining the locking means in engagement with the recess means, means limiting outward movement of the plunger to said limit position, said plunger being of reduced diameter outwardly of and adjacent said stop portion to permit the locking means to recede thereinto upon movement of the plunger inwardly against the action of said resilient means, the head of said shank having a non-circular drive tool engageable section, and lock releasing means comprising an axial extension of said plunger projecting through an aperture in said head and into the area occupied by a drive tool when operatively engaging the drive section and engageable by the drive tool in its placement to move the plunger against the action of said resilient means to a position with the stop portion displaced from the locking means and the reduced diameter portion accessible for receiving the locking means thereby releasing the locking means to automatically unlock the fastener during assembly and removal of the stud member relative to the receptacle, the distance between the end of the external thread on the shank to the lateral center line of the locking means being at least equal to the distance from the center line of the locking means to a point along the adjacent wall surface of the first workpiece so that when the releasing means is depressed by the drive tool the stud member can be backed off to a point where the locking means will engage within the aperture in the first workpiece and thereafter clear the first workpiece with the locking means moved outwardly under influence of the spring biased plunger to a position for engaging the second workpiece and thereby trap the stud member thereon.

2. A fastener device as claimed in claim 1, wherein the locking means comprises opposed balls disposed in said radial aperture.

3. A fastener device as claimed in claim 1, wherein the means limiting outward movement of the plunger includes a rod section on the plunger projecting beyond said shoulder and carrying at the end thereof a head engageable with said shoulder to limit the outward movement of the plunger.

4. A fastener device as claimed in claim 3, wherein the resilient means comprises a coil spring through which said rod section extends.

References Cited in the file of this patent

UNITED STATES PATENTS

| | | |
|---|---|---|
| 1,433,410 | Passauer | Oct. 24, 1922 |
| 1,845,428 | Llewellyn | Feb. 16, 1932 |
| 2,338,333 | Jenkins | Jan. 4, 1944 |
| 2,408,560 | Keehn | Oct. 1, 1946 |
| 2,515,807 | Spooner | July 18, 1950 |
| 2,615,177 | Schlichting | Oct. 28, 1952 |
| 2,758,625 | Poupitch | Aug. 14, 1956 |

FOREIGN PATENTS

| | | |
|---|---|---|
| 542,028 | Great Britain | Dec. 23, 1941 |
| 559,145 | Great Britain | Feb. 7, 1944 |
| 575,355 | Great Britain | Feb. 14, 1946 |
| 530,952 | Canada | Sept. 25, 1956 |